United States Patent [19]
Roth

[11] 3,815,980
[45] June 11, 1974

[54] MEANS FOR AUTOMATICALLY RECORDING A TITLE OR HEADING IN MOVIE CAMERAS

[75] Inventor: Johann Roth, Schwabhausen, Germany

[73] Assignee: Braun Aktiengesellschaft, Frankfurt/Main, Germany

[22] Filed: Mar. 27, 1973

[21] Appl. No.: 345,478

[30] Foreign Application Priority Data
Mar. 28, 1972  Germany........................... 2215189

[52] U.S. Cl. ................................... 352/90, 95/1.1
[51] Int. Cl. ............................................ G03b 21/32
[58] Field of Search ......................... 352/90; 95/1.1

[56] References Cited
UNITED STATES PATENTS

| | | | |
|---|---|---|---|
| 1,143,522 | 6/1915 | Faber................................. | 352/90 |
| 2,998,761 | 9/1961 | Cooper.............................. | 95/1.1 |
| 3,649,111 | 3/1972 | Miyoshi............................. | 352/90 |

*Primary Examiner*—Monroe H. Hayes
*Attorney, Agent, or Firm*—Ernest F. Marmorek

[57] ABSTRACT

A movie camera having a projection arrangement including an objective having a reflecting arrangement, a projection lamp, a title or heading information carrier placed in the projection arrangement in such a manner that the information on it is projected through the reflecting arrangement into the path of the light passing through the objective to the film, an arrangement for causing the recording of the title or heading information on the film strip at the beginning of the operation of the camera including a switching disc biased between a rest position and an end position, a driving means provided on said switching disc, a film advancing mechanism, means for coupling the driving means with the film advancing mechanism, the switching member having a contact operating portion, a switching arm adapted to engage the contact portion, a switch coupled to the switch arm and effecting energization of a projection lamp when in contact with the contact portion, a decoupling means for decoupling the driving means of the film advancing mechanism when the movie camera is open for changing the film, the switch further comprising a contact for energizing the film advancing mechanism when the film receiving space of the camera is loaded and closed again.

14 Claims, 2 Drawing Figures

MEANS FOR AUTOMATICALLY RECORDING A TITLE OR HEADING IN MOVIE CAMERAS

CROSS-REFERENCE TO OTHER APPLICATIONS

Application of Johann Roth, Ser. No. 297,016, filed Oct. 12, 1972, entitled "Method and Apparatus for Synchronous Recording of Sounds for a Film," and application of Johann Roth entitled Movie Camera, Ser. No. 345,241 filed Mar. 26, 1973.

FIELD AND BACKGROUND OF THE INVENTION

The present invention relates to an automatic title or heading recording device for movie cameras in which there is at least a partially reflecting arrangement placed in the path of the light which passes through the objective of the optical system of the camera.

SUMMARY OF THE INVENTION

It is an object of the present invention to provide an improved movie camera having an improved title and heading recording device therein and in which when new film is inserted into the camera the camera will automatically record the title or a similar heading information on the film frame.

According to the present invention the title recording mechanism includes a projection arrangement for a picture information carrier such as a slide, which is built into the camera having a projection lamp operable with a switch, and a projection objective which projects an image or a picture of the information carrier slide over a reflecting arrangement into the path of the light rays passing through the objective, that is onto the film, and which further includes a switching member which is mechanically spring-biased and which can be moved between a rest position and an end position, including further a driving member which over the major portion of the movement of the switching member remains in driving connection with the film advancing mechanism, and which further includes a switch operating surface which extends over a smaller region than would correspond to the path of movement during the operational connection, and which is also in operating relationship with the switching means for the projection lamp. The apparatus according to the present invention further includes a decoupling means which brings the driving member of the title recording arrangement out of engagement with the film transporting or advancing mechanism as long as the movie camera is open or not being loaded and further includes a turn-on switch means which is in operating connection with the switch operating surface and which is intended for turning on the film advancing mechanism after the title recording mechanism recorded the information.

Such a title or heading recording arrangement will have the effect that the picture information, such as title or heading, which is recorded on a picture information carrier becomes recorded on the film without any interference on the part of the user of the camera and at the beginning of the film strip, and also that the movie camera after the completion of such title or heading recording will become automatically restored to the normal state, that is ready for further operation.

Preferably the switching member is in the form of a disc and the switch operating surface is a curved surface on the disc.

According to a further aspect of the present invention the driving member is a wheel coupled with the disc and which in its non-operative region is recessed in the radial direction inwardly so that when such a radial recess is reached, there will be no operating connection with the remaining portions. The wheel itself can be in the form of a toothed wheel in the region of which intended for the non-operative part of the wheel, the teeth are removed.

The decoupling device preferably is in the form of a lever which at one end thereof engages the drive member and at the other end it projects into the space intended for the film cassette or up to the wall portion which can be opened up during reloading, and which is constructed in a manner that in the event there is a defect in the film cassette or if the wall covering the film cassette is open, then the driving member becomes disengaged.

The decoupling device in another embodiment thereof can be an axially slidable disc which can undergo a displacement by the film cassette or by the wall which opens up during reloading, in an axial direction, whereupon the driving member of the disc will become disengaged with the film advancing mechanism in the event there is a defect in the film cassette or if the reloading wall portion is opened. Such construction can be easily manufactured.

In the event a disc is used as the switching member, then the disc preferably has a boss or abutting surface which in the rest portion will abut or lie against a counter surface which is fixed on the housing.

The switch is provided preferably with an additional contact pair for performing the switching of the exposure or light meter or the light controlling devices.

In the case of movie cameras which have a synchron pulse generator for aiding the synchronization of the sound onto the film, the switching means is provided preferably with a further contact pair for disconnecting the synchron pulse generator during the recording of the title or heading.

It is desirable that the switching means and the contact pairs are arranged in such a manner that the switching means for the projection lamp is turned on earlier and turned off at least simultaneously with the switching means for the film advancing mechanism to avoid further recording of the title into the scene. In the event there is an additional contact pair for the light meters, it becomes preferably switched on together with the turning-on of the film advancing mechanism, that is, during the normal operation of the camera, after the title recording has been performed automatically.

BRIEF DESCRIPTION OF THE DRAWINGS

The invention will become more rapidly apparent from the following description of a preferred embodiment thereof, shown by example in the accompanying drawings, in which.

DESCRIPTION OF THE PREFERRED EMBODIMENT

Figure 1:
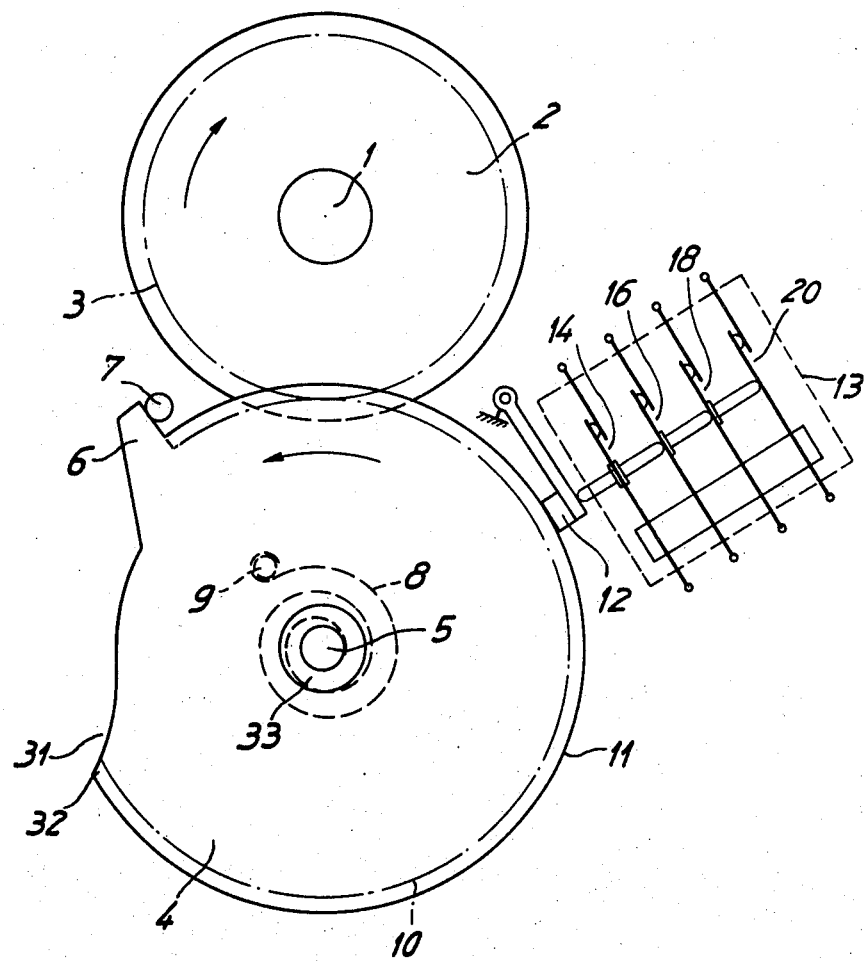
FIG. 1 is a partial illustration in top view of a movie camera illustrating the essential portions thereof necessary for the understanding of the present invention.

FIG. 1 illustrates in plan view the space of a movie camera which serves for the reception of a film cassette when the wall portion of the camera is open during loading. A receiving pin 1 can be seen onto which a film spool 2 can be inserted and which spool in certain cases can be also in the form of a film cassette. The receiving pin 1 of the cassette is driven by a film advancing mechanism, which is not shown on the drawing and which is usually an electromotor having a reduction gear. The receiving pin 1 has fixedly connected therewith a toothed wheel 3. The title or heading recording arrangement includes a disc 4 which is rotatably mounted on a pin 5. The disc 4 has a projection 6 provided thereon which serves as the abutting surface in the rest position and abuts against a counter boss 7 in the rest position. The counter boss 7 is fixedly mounted on the housing of the camera.

Concentrically with the pin 5 there is a spiral spring 8 provided, the inner end of which is fixedly connected with the pin 5 and the outer end of which is secured at a retaining pin 9 on the disc 4. The spiral spring 8 forms a resetting spring which biases the disc 4 into its rest position in which the projection 6 lies against the abutting surface 7.

The disc 4 forms the switching member for the title or heading recording device and over the major portion of its path of movement it has an arcuate toothed portion 10 which is moved into engagement with the teeth of the toothed wheel 3 when the cassette is in its place and the wall portion is closed as hereinafter described.

In its end region which lies opposite and adjacent to the rest position region, the disc 4 is provided with a recess 31 in the radial direction so that this region does not have any teeth 10 provided therein.

The disc 4 furthermore is provided with an arcuate surface 11 lying concentrically with respect to the pin 5 and which in the end region of the disc 4 is also recessed similarly as the toothed portion 10.

On the arcuate surface 11 a switching lever or arm 12 slides and operates a switching mechanism 13 which has several contact pairs provided therein numbered as 14–20.

The switching mechanism 13 includes a first make contact pair 14 which closes the energizing circuit for the projection lamp 15.

The switching mechanism 13 further comprises a second make contact pair 16 which serves to actuate the energizing circuit for a light meter 17.

The switch means 13 also comprises a third contact pair 18 which energizes the circuit for the driving motor 19 for the film advancing mechanism.

In the event the movie camera is provided with a synchron pulse generator then a fourth contact pair 20 can be provided which is intended to close or block the synchron pulse generator when the title or heading recording arrangement is in operation.

Figure 2:
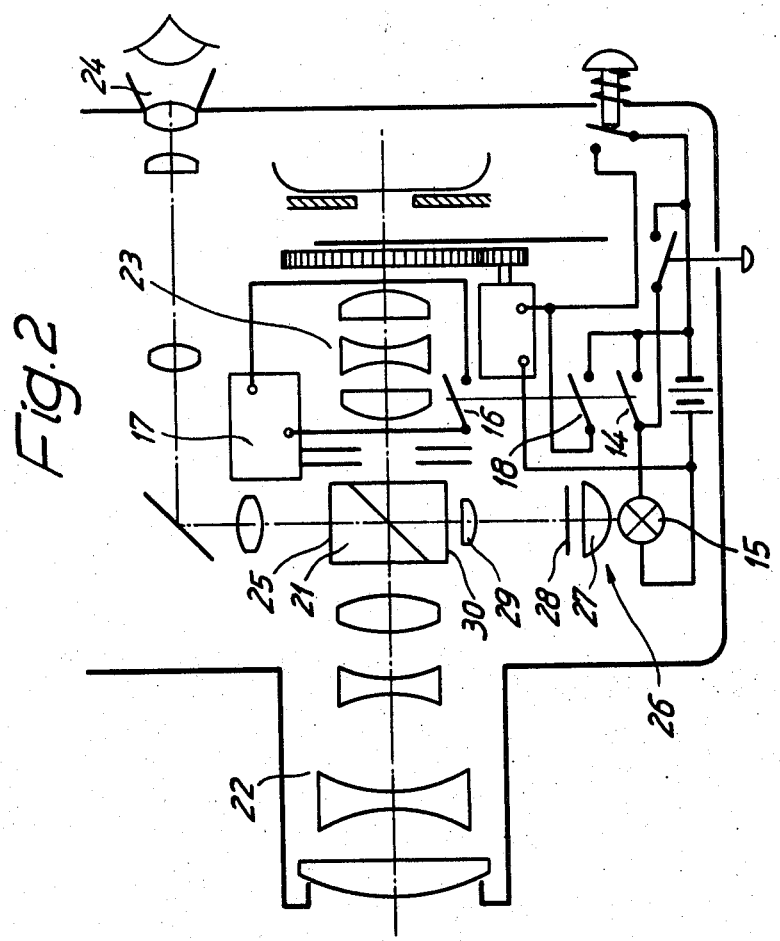
FIG. 2 is a schematic illustration of the optical arrangement of a movie camera including the projection arrangement for the title information and some of its electrical circuits necessary for the understanding of the present invention.

With reference to FIG. 2 illustrating also the projection arrangement of the title recording device, one can observe that a light splitting prism 21 is provided which is arranged between the front member 22 and the back member 23 of an objective which has a variable or adjustable focal length. The splitting prism 21 serves to divert a portion of the light beam reaching the objective into a finder 24.

Opposite to the light exit side 25 of the light splitting prism 21 and facing the finder 24 lies a projection arrangement which includes the projection lamp 15, a condenser lens 27, a slide or diapositive 28 carrying the title or heading information and a projection lens 29. The individual members of the projection arrangement are arranged behind each other in the above indicated sequence and affect the projection of the image of the diapositive or slide 28 over the beam splitting prism 21 into the path of the light rays of the finder 24 and of the back member 23 of the camera objective. For this purpose the light entry side 30 of the beam splitting prism 21 adjacent to the projection lens 29 is polished.

The illustrated title or heading recording arrangement operates as follows:

The disc 4 is mounted on the pin 5 in an axially freely moveable fashion and it is biased not only in the direction of rotation as described above but also axially in such a fashion that in its axial rest position, the disc 4, has its teething 10 out of engagement with the toothed wheel 3 due to the axial displacement with respect thereto. As a result the disc 4 under the effect of the spiral spring 8 can be rotated into its angular rest position in which the projection 6 abuts against the bolt or abutting surface 7. On the pin 5 there is arranged a hub 33 which is secured to the disc 4 which projects into the side wall, not illustrated in the figures, and which has to be opened when there is a need for changing the film. The pin 5 and the hub 33 are constructed in such a manner that the disc 4 can move axially in two positions, more particularly, into an axial rest position in which the teeth 10 are out of engagement with the toothed wheel 3 and into an operating axial position, in which the disc 4 moves into engagement with its teething 10 with the toothed wheel 3 against its axial spring bias. As a result, there is a driving coupling between these two parts, namely between the wheel 3 and the disc 4. Such axial displacement of the disc is the result of the fact that during the closing of the side wall of the cassette space, the side wall is pressed against the hub 33 and it presses it in the axial direction by a certain amount and causes its displacement by a certain amount so that the driving coupling with the wheel is established. By the axial movement of the disc 4 the arcuate surface 11 moves into the path of the switching lever 12 so that the lever 12 will operate the switch means 13 and some of the contact pairs thereby become switched. For this purpose the switch lever or arm 12 can have a slight rounding on its surface coming into engagement with the arcuate surface 11 in order to facilitate the running up of the lever 12 onto the arcuate surface 11 from recess 31. By operating the switch lever 12 the contact pair 14 becomes switched, that is, closed, which will then close the energization of the projection lamp 15. Simultaneously, the receiving pin 1 becomes driven by the toothed wheel 3 due to the driving coupling with the teething 10 of the disc 4 and the disc 4 is rotated in the direction of the arrow in FIG. 1. The energization of the projection lamp 15 is kept so long as the switch lever 12 is operated, that is, during the title recording process. The operation of the switch lever 12 is discontinued when the switch lever 12 runs into the recessed region 31 of the arcuate disc 11. On such a recessed region 31 no teething is present, so if the toothed wheel 3 becomes rotated further it may be through a further running of the driving mechanism or by a subsequently following operation of the movie camera, but the disc 4 will discontinue to rotate as soon as the end 32 of the teething 10 leaves the toothed wheel 3. The disc 4 remains then in this position until the side wall of the cassette space is open again where the teeth of wheel 3 are axially displaced from disc 4, since the disc 4 is able to move or be displaced axially, and the spiral spring 8 can return it into its angular rest position where the arm 12 is also in disengagement with the rim 11 of disc 4.

Instead of an axial movement of the disc 4 in order to achieve a decoupling of the disc 4 from the toothed wheel 3, one may provide according to the present invention, also a different decoupling arrangement, such as causing a movement of the disc 4 from its plane with wheel 3 by means of a lever arrangement.

By operating the switching lever 12 also the second contact pair 16 becomes closed and will energize a light-meter for automatically adjusting the shutter of the objective being connected thereto in such a manner that when such contact pair 16 is closed, the light meter becomes adjusted so that the shutter is closed to thereby avoid exposure during title recording.

By operating the switch lever or arm 12 the third contact pair 18 becomes also closed which switches on the driving motor 19.

Finally during the rotation of the disc 4 one more contact pair 20 becomes closed, which serves for turning off a synchron pulse generator the function of which is to synchronize the sound pulse for the sound synchronization on a magnetic tape.

The contact pairs 14 and 16 serving for controlling the projection lamp 15 and the light meter 17 are arranged in such a manner that they close earlier and open up at least simultaneously with the contact pair 18 which controls the driving motor and which controls also the turning off the synchron pulse generator. As a result, the projection lamp 15 is turned on only during the title recording and the contact for the light measuring control 17 is also deenergized before the scene film starts to run. As a result from the very beginning on, the right conditions are created for the title or heading recording and an undesired exposure of the film is prevented.

By the turning off of the synchron pulse generator by the contact pair 20 one attains that during the running of the title recording arrangement no synchron pulses are delivered so that the sound synchronization is not affected.

There are obvious variations within the scope of the present invention, such as for instance, instead of the disc 4 one could provide a pinion and rack arrangement which would practically represent an equivalent of the circumference of the disc 4. Also the driving coupling between the receiving pin 1 and the wheel 3 as well as the disc 4 can be attained in other equivalent fashion, such as for example, by using friction wheels, or capstans.

In movie cameras which instead of an electric drive motor are provided by spring driving means, the contact pair 14 can obviously be omitted and replaced by a mechanical switch which takes care of the coupling and disengagement of the driving spring arrangement.

The title or heading recording arrangement according to the present invention has the advantage among others that after closing the side wall portion after the change of the film cassette has taken place, a certain time period, about 1–3 seconds, will pass before the film advance mechanics is set in motion, so that during that time period a projection of the slide 28 can be had onto the film strip.

In the event in the illustrated embodiment of the present invention the wall of the movie camera is closed without the insertion of a new cassette into the cassette space, then obviously the title or heading recording arrangement becomes energized but it will turn itself off after the above mentioned certain time period.

Instead of the wall portion serving for the changing of the film cassette, one may provide a decoupling of the driving member from the film advancing mechanism by using some other construction elements which can be displaced into another operative position during the loading of the movie camera.

I wish it to be understood that I do not desire to be limited to the exact details of construction shown and described, for obvious modifications will occur to a person skilled in the art.

Having thus described the invention, what I claim as new and desire to be secured by letters Patent, is as follows:

1. A movie camera comprising a projection arrangement including an objective means having a reflecting arrangement, a projection means, a title or heading information carrier means placed in said projection arrangement in such a manner that the information of said information carrier is projected through said reflecting arrangement into the path of the light passing through said objective means on the film, an arrangement for causing the recording of said title or heading information on the film strip at the beginning of the operation of said camera comprising a switching member, means for biasing such switching member between a rest position and an end position, a driving means provided on said switching member, a film advancing mechanism, means for coupling said driving means with said film advancing mechanism, said switching member comprising a contact operating portion, a switch arm means adapted to engage said contact operating portion, a switching means coupled to said switch arm means and effecting energization of said projection means when in contact with said contact operating portion of said switch means, a decoupling means for the decoupling of the driving means of the film advancing mechanism from said switching member when the movie camera is open for changing the film, said switching means further comprising contact means for energizing the film advancing mechanism when the film receiving space of the camera is loaded and closed again.

2. The movie camera as claimed in claim 1, wherein said switching member comprises a disc means and said contact operating portion comprises an arcuate portion of said disc means.

3. The movie camera as claimed in claim 2, wherein said coupling means comprises a wheel means adapted to be coupled with the driving means on said disc means, said disc means having a portion radially recessed for providing a further decoupling means, said disc means having a toothed member thereon, having a radial recess similar to the recess of said disc means.

4. The movie camera as claimed in claim 3, wherein said wheel means is a toothed wheel means and said recessed portion of said disc means is without teeth.

5. The movie camera as claimed in claim 1, wherein said decoupling arrangement comprises a lever arrangement engaging at one end thereof said driving member and at the other end thereof the wall portion of said camera housing adapted to be open when a film cassette is loaded into the camera, said lever arrangement being constructed in a manner that when there is no film cassette in the space provided within the camera or when said loading wall portion is open, said driving means is out of engagement with the film advancing mechanism.

6. The movie camera as claimed in claim 1, wherein said decoupling arrangement comprises means for biasing said disc means axially when a film cassette is in the receiving space and said wall portion is closed, whereby when said space for the film cassette is empty and said receiving wall portion is open, said disc means is out of engagement with said film advancing mechanism.

7. The movie camera as claimed in claim 6, wherein said disc means comprises a projection, a counter projection provided in the path of said projection on said disc means and fixedly connected with the housing for engagement with said projection of said disc means at a predetermined position of said disc means, said predetermined position being the angular rest position of said disc means.

8. The movie camera as claimed in claim 1, wherein said switch means comprises a further contact pair for effecting energization of a lightmeter arrangement, controlling the shutter of the camera.

9. The movie camera as claimed in claim 1, wherein said switch means comprises a further contact pair for disconnecting a synchron pulse generator during the operation of said title or heading recording arrangement.

10. The movie camera as claimed in claim 1, wherein said switch means comprises a plurality of contact pairs, said contact pairs being arranged in said switch means in such a manner that the contact pair energizing said projection lamp is actuated earlier and disconnects said projection lamp at least simultaneously with the energizing of the film advancing mechanism for normal operation.

11. The movie camera as claimed in claim 8, wherein said contact means for energization of the lightmeter means is arranged for closing the shutter means simultaneously with the energization of said projection lamp.

12. The movie camera as claimed in claim 1, wherein said switch arm is provided with a rounded run-up surface.

13. A movie camera as claimed in claim 7, wherein said projection limits the switch operating path.

14. The movie camera as claimed in claim 1, wherein a further contact pair is provided for energizing the film advancing mechanism.

* * * * *